United States Patent [19]

Mibu et al.

[11] Patent Number: 4,932,311
[45] Date of Patent: Jun. 12, 1990

[54] FLUID APPARATUS

[75] Inventors: Kazuo Mibu; Yoshihide Ohi; Hiromitsu Yamamoto, all of Osaka, Japan

[73] Assignee: Daihatsu Diesel Mfg. Co., Ltd., Osaka, Japan

[21] Appl. No.: 229,062

[22] Filed: Aug. 5, 1988

[30] Foreign Application Priority Data

Dec. 29, 1987 [JP] Japan .................. 62-334045

[51] Int. Cl.⁵ ............................................. F15B 15/22
[52] U.S. Cl. ........................................ 91/361; 91/165; 91/404; 91/459; 92/32; 92/33; 188/161; 303/115; 303/116
[58] Field of Search ...................... 91/361, 362, 363 R, 91/459, 24, 32, 404, 405, 165, 166; 92/32, 33, 85 B; 303/115, 116

[56] References Cited

U.S. PATENT DOCUMENTS

| | | | |
|---|---|---|---|
| 2,936,737 | 7/1955 | Miller | 91/459 |
| 3,807,810 | 4/1974 | Yarber | 303/119 |
| 4,075,930 | 2/1978 | Millet | 91/361 |
| 4,106,390 | 8/1978 | Kodaira et al. | 91/361 |
| 4,235,156 | 11/1980 | Olsen | 91/363 R |
| 4,545,289 | 10/1985 | Weyer | 92/33 |
| 4,691,813 | 9/1987 | Dittner et al. | 303/115 |
| 4,779,513 | 10/1988 | Kimura | 92/85 B |

FOREIGN PATENT DOCUMENTS 3219730 12/1983 Fed. Rep. of Germany ........ 91/361

Primary Examiner—Edward K. Look
Assistant Examiner—John Ryznic
Attorney, Agent, or Firm—Wenderoth, Lind & Ponack

[57] ABSTRACT

A fluid apparatus includes a pneumatic cylinder having a main body, a piston, and a hollow rod. A ball screw shaft engaged with a ball nut fixed to the piston is rotatably and axially unmovably mounted in the cylinder and extends in the hollow rod. A magnetic brake for braking the ball screw shaft is fixed to an end portion of the main body of the cylinder. The number of revolutions of the ball screw shaft is detected and outputted in a signal form by a rotary encoder. A primary solenoid controlled valve reciprocates the piston by connecting a pressure source either to a first or second port of the cyliner, and secondary solenoid controlled valves connect a pressure source either to a first braking pressure port or to a second braking pressure port. A controller outputs a drive signal for controlling the primary solenoid controlled valve, and outputs a primary braking signal and a secondary braking signal according to a corresponding operational section as well as deviation of the number of revolutions of the ball screw shaft from a target value. The primary braking signal switches on or off the secondary solenoid controlled valves to apply back pressure to the piston, and the secondary braking signal is for operting the magentic brake.

9 Claims, 7 Drawing Sheets

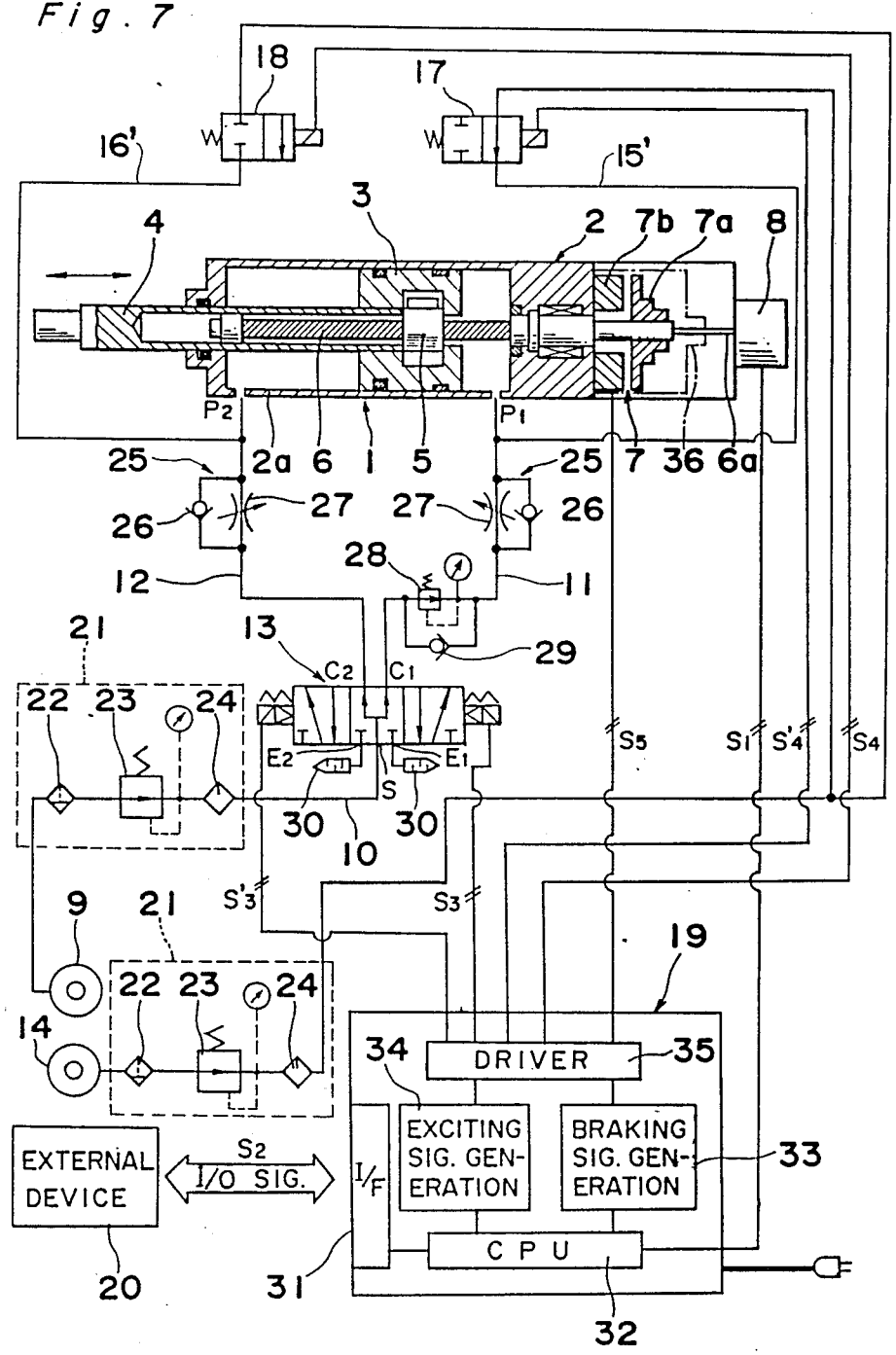

4,932,311

FLUID APPARATUS

BACKGROUND OF THE INVENTION

1. Field of the Invention

The present invention relates to a fluid apparatus for controlling the operation amount (stroke) of the piston rod of a hydraulic cylinder.

2. Prior Art

In a known fluid apparatus of this kind, positioning of a piston rod, which is hollow, in a pneumatic cylinder is effected by converting a linear movement of the piston rod into the rotation of a ball screw shaft and detecting the amount of the rotation. In this fluid apparatus, a piston having the hollow piston rod is slidably mounted in a tube of the pneumatic cylinder, and a ball nut is fixed to the piston coaxially with this piston, and a ball screw shaft engaged with the ball nut and extending in the hollow piston rod is rotatably and axially unmovably mounted to a main body of the cylinder. A magnetic brake for braking the rotation of the ball screw shaft is mounted between the main body of the pneumatic cylinder and the ball screw shaft, and a rotary encoder which generates and outputs pulse signals in accordance with the angle of rotation of the ball screw shaft is mounted at an end of the ball screw shaft. A controller compares the pulse signal, received from the rotary encoder, indicating an actual position of the piston rod with a signal indicating a preset target position. When the levels of both signals coincide, the controller provides a braking signal to the magnetic brake and stops the supply of drive air to the piston so as to stop the piston rod at the target position. In this fluid apparatus, as the linear movement of the piston rod is converted into the rotation of the ball screw shaft through the ball nut, and stopping of the linear movement of the piston rod is effected by stopping the rotation of the ball screw shaft by means of the magnetic brake, this piston rod slips less and is stopped more reliably than a piston rod directly clamped (not through the ball nut). Further, advantageously, energy required for the braking operation is reduced. In addition, the piston rod can be held by a great force because the magnetic brake is used.

The above-described fluid apparatus has, however, the following problems. Firstly, because the magnetic brake keeps on acting on the ball screw shaft for a period of time corresponding to the speed of the piston rod, the magnetic brake is subject to abrasion on a friction surface thereof and the pressing force of the friction surface thereof varies with time. As a result, the braking force to be applied to the ball screw shaft becomes uneven, and accuracy in stopping or positioning the piston rod at a desired position or in controlling the speed of the piston rod decreases gradually. Secondly, magnetic brakes cause greater vibration and shock and reduce the speed of piston rods at a higher rate than other kinds of brakes. For this reason in addition to the continuous braking operation of the magnetic brake as described above, the magnetic brake and the main body of the pneumatic cylinder are not durable and the load-applied side of the main body adjacent to the piston rod is subject to the vibration generated by the magnetic brake.

SUMMARY OF THE INVENTION

It is therefore an object of the present invention to provide a fluid apparatus including a brake means operated in combination with a magnetic brake so that a continuous braking by the magnetic brake and a big shock generated by the application of the magnetic brake are prevented, whereby the life of the magnetic brake and a hydraulic cylinder are prolonged, and a piston rod can be speed-controlled, stopped, and positioned at a desired position precisely.

In order to achieve the object, a fluid apparatus in accordance with the present invention is characterized by that it comprises a hydraulic cylinder which includes a main body having a tube, a piston slidably mounted in the tube, and a hollow rod fixed to the piston, wherein the hollow rod accommodates therein a ball screw shaft which is rotatably and axially unmovably mounted in the main body and is engaged with a ball nut fixed to the piston coaxially therewith, and an end portion of the ball screw shaft projects from the main body; a magnetic brake which is fixed to an end portion of the main body of the hydraulic cylinder, and brakes the rotation of the ball screw shaft; a rotary encoder for detecting the number of revolutions of the ball screw shaft of the hydraulic cylinder and outputting electric signals indicative of the detected number of revolutions; a primary solenoid controlled valve for reciprocating the piston by connecting a pressure source either to a first port or to a second port of the hydraulic cylinder; a first braking line connected to a first braking pressure port of the hydraulic cylinder; a second braking line connected to a second braking pressure port of the hydraulic cylinder; secondary solenoid controlled valves connected to the first and second braking lines for connecting a pressure source either to the first braking pressure port or to the second braking pressure port; and a controller which outputs a drive signal for controlling the primary solenoid controlled valve on one hand, and on the other hand, smoothly stops the piston at a target position by outputting a primary braking signal and a secondary braking signal in accordance with a corresponding operational section as well as deviation of the signal received from the rotary encoder from a signal indicating a predetermined target value, the primary braking signal being for switching on or off the secondary solenoid controlled valves so that back pressure is applied to the piston driven by pressure of a fluid which flows from the pressure source through the primary solenoid controlled valve, and the secondary braking signal being for operating the magnetic brake.

The operation of the fluid apparatus in accordance with the present invention is described hereinafter.

When the target value of the hollow rod is set in the controller, the primary solenoid controlled valve which is actuated by a drive signal outputted from the controller connects the pressure source to the first port of the hydraulic cylinder. Thus, the piston moves. The stroke or linear movement of the piston is converted into the rotation of the ball screw shaft through the ball nut fixed to the piston and the number of revolutions of the the ball screw shaft corresponding to the displacement of the piston is detected by the rotary encoder, which outputs a signal indicative of the detected number of revolutions to the controller. The controller outputs the primary braking signal to the secondary solenoid controlled valves for switching them in accordance with a deviation between the level of the signal received from the rotary encoder and the signal indicating the target value as well as a corresponding operation sections, whereby pressure of the fluid which has flowed from the pressure source through the second braking line acts on the second braking pressure port of the hydraulic cylinder and back pressure is applied to the piston in motion. The controller outputs the secondary braking signal for actuating the magnetic brake in accordance with the above-described deviation and the operation sections, in particular when the rod is in the vicinity of the target position, whereby the rotation of the ball screw shaft is braked and the piston coupled with the ball screw shaft through the ball nut stops at a desired position.

The controller outputs the braking signals in different ways; for example, the primary braking signal in the early period during a braking operation and the primary and secondary signals in the middle period, the secondary braking signal in the late period. The controller is capable of outputting those signals intermittently or continuously; for example, both of the primary and secondary braking signals are outputted intermittently, or the primary braking signal is outputted continuously and the secondary braking signal is outputted intermittently. Owing to the braking system and the control for each of the operation sections, vibration and shock generated during the braking operation by the magnetic brake is relieved, whereby the piston can be stopped and positioned at a desired position, and the life of the magnetic brake is prolonged. The same holds with the braking operation to piston rod in a backward stroke.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 shows another embodiment of the present invention.

DETAILED DESCRIPTION OF PREFERRED EMBODIMENTS

An embodiment of a fluid controlling apparatus in accordance with the present invention is described in detail hereinafter with reference to the drawings.

Figure 1:
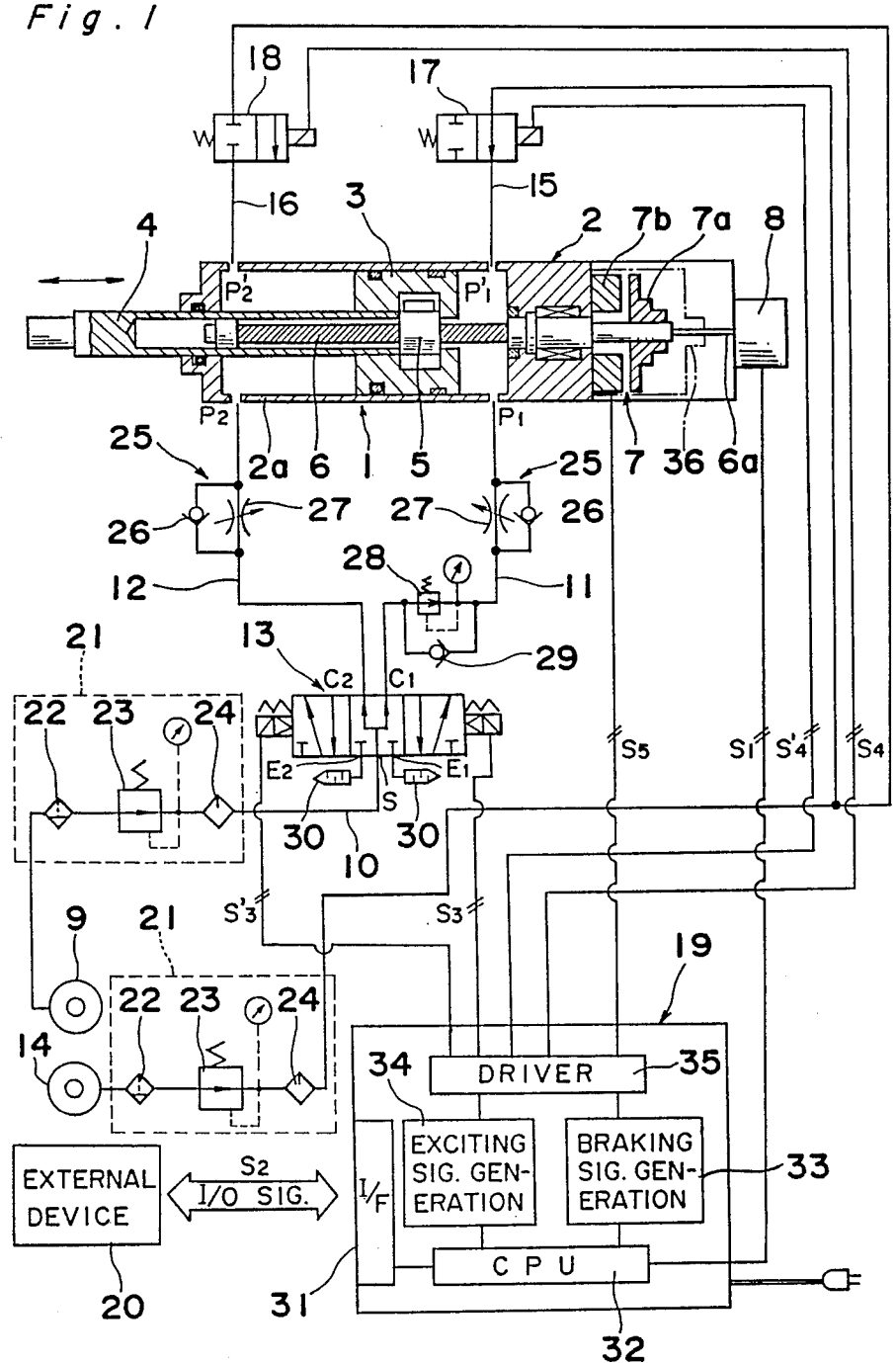
FIG. 1 schematically shows an embodiment of a fluid apparatus in accordance with the present invention.

Referring now to FIG. 1, reference numeral 1 designates a pneumatic cylinder as a hydraulic cylinder which includes a main body 2 having a tube 2a and a piston 3 slidably mounted in the tube 2a of the main body 2, wherein a hollow piston rod 4 fixed to the piston 3 accommodates therein a ball screw shaft which is rotatably and axially unmovably mounted in the main body 2 and is engaged with a ball nut 5 fixed to the piston 3 coaxially with the piston 3. Reference numeral 7 designates a magnetic brake which includes an armature 7a slidably and unrotatably mounted to the ball screw shaft 6 projecting from an end of the main body 2 and an electromagnet 7b which is fixed to the main body 2 and confronts the armature 7a. Reference numeral 8 designates a rotary encoder for detecting the number of revolutions of the ball screw shaft 6.

A primary solenoid controlled valve 13 of a spring centered, 3-position, 5-port connection type connects a main line 10 connected to a first air source 9 either to a first line 11 communicated with a first port $P_1$ of the pneumatic cylinder 1 or to a second line 12 communicated with a second port $P_2$ thereof. A first braking line 15 connects a first braking pressure port $P_1'$ provided on the tube 2a of the pneumatic cylinder 1 on the side opposite to the first port $P_1$ to a second air source 14. A second braking line 16 connects a second braking pressure port $P_2'$ provided on the tube 2a of the pneumatic cylinder 1 on the side opposite to the second port $P_2$ to the second air source 14. Secondary solenoid controlled valves 17 and 18 of a normally closed, spring offset, 2-position, and 2-port connection type are provided on the first braking line 15 and the second braking line 16, respectively.

A controller 19 outputs not only drive signals $S_3$ and $S_3'$ for controlling the primary solenoid controlled valve 13 but also primary braking signals $S_4$ and $S_4'$ and secondary braking signal $S_5$ in accordance with operational sections (described later in detail) of the piston rod 4 as well as deviation between the signal $S_1$ received from the rotary encoder 8 and a signal indicating a predetermined value, set by a signal input device (not shown) mounted on the controller 19, corresponding to a target position. The primary braking signals $S_4$ and $S_4'$ are for switching on or off the second solenoid controlled valves 17 and 18 so that back pressure is applied to the piston 3 driven by air which flows through the primary solenoid controlled valve 13, and the secondary braking signal $S_5$ for operating the magnetic brake 7. The controller can stop the piston rod 4 at desired positions by appropriately outputting the primary and secondary braking signals.

Air pressure adjusting units 21, 21 are mounted alongside the first air source 9 of the main line 10 and the second air source 14, respectively. Each of the units 21, 21 has a pressure reducing valve 23 between an air pressure filter 22 and a lubricator 24. The first line 11 and second line 12 connected to the pneumatic cylinder 1 each are provided with a speed control valve 25 by a meter-out method. The speed control valve 25 includes a check valve 26 and a variable throttling valve 27 connected with each other in parallel. On the first line 11 are disposed a pressure reducing valve 28 and a check valve 29 for preventing air from flowing toward the first port $P_1$ in parallel with each other between the speed control valve 25 and the primary solenoid controlled valve 13.

The primary solenoid controlled valve 13 has a supply port S, cylinder ports $C_1$ and $C_2$, and exhaust ports $E_1$ and $E_2$. The supply port S communicates with the cylinder ports $C_1$ and $C_2$ when the primary solenoid controlled valve 13 is at a neutral position. Air is supplied to the first port $P_1$ of the pneumatic cylinder 1 when the primary solenoid controlled valve 13 is at a offset position on the right-hand side of the drawing and to the second port $P_2$ of the pneumatic cylinder 1 when it is at the other offset position on the left-hand side. Mufflers 30 are mounted at the exhaust port $E_1$ and $E_2$, respectively. When the primary solenoid controlled valve 13 takes the right offset position in response to the drive signal $S_3$ transmitted from the controller 19, the secondary solenoid controlled valve 18 is switched to a offset position on the right-hand side of the drawing in response to the primary braking signal $S_4$ transmitted from the controller 19 so as to supply back pressure to the second braking pressure port $P_2'$. Likewise, the secondary solenoid controlled valve 17 is switched to a offset position on the right-hand side in response to the primary braking signal $S_4'$ so as to supply back pressure to the first braking pressure port $P_1'$ when the primary solenoid controlled valve 13 is at the left offset position in response to the drive signal $S_3'$.

The controller 19 includes an interface 31 for reciprocating a signal $S_2$ with an external device 20. The signal $S_2$ indicates either how the pneumatic cylinder 1 is operated by the controller 19 or how it is remote-controlled by the external device 20. The controller 19 further includes a CPU 32 which controls the controller 19 and performs an operation necessary for controlling the pneumatic cylinder 1 in response to the signal $S_2$ inputted through the interface 31 and the signal $S_1$ inputted from the rotary encoder 8, respectively, a brake signal generation portion 33 which generates the secondary braking signal $S_5$ to be provided to the magnetic brake 7 in response to the signal transmitted from the CPU 32, an exciting signal generation portion 34 which generates the drive signals $S_3$ and $S_3'$ to be supplied to the primary solenoid controlled valve 13 and the primary braking signals $S_4$ and $S_4'$ to be fed to the respective secondary solenoid controlled valves 17 and 18 in response to a signal transmitted from the CPU 32, and a driver 35 which amplifies and outputs the signals received from the signal generation portions 33 and 34.

Figure 2A:
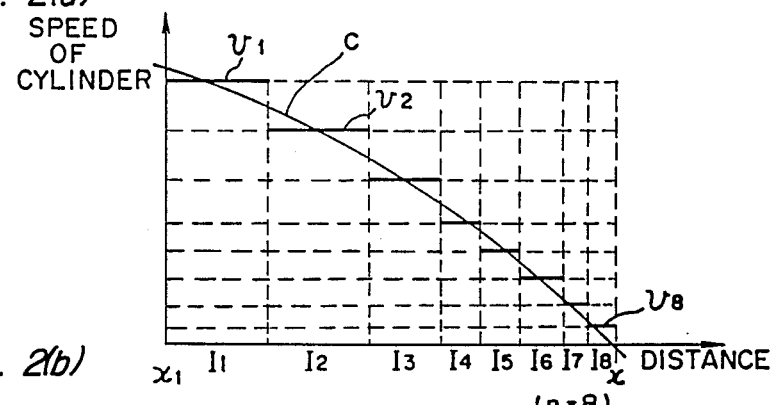
FIGS. 2(a), 2(b) and 2(c) schematically show graphs for explaining the control by a controller of the fluid apparatus.

When the CPU 32 receives a signal indicating the start of the positioning from a device equipped in the controller 19 or from the external unit 20, the CPU 32 divides the distance between a speed reduction starting position $X_1$ and a target position X into (n) pieces of operation sections $I_1, \ldots, I_i, \ldots, I_n$ and determines target piston speeds $V_1, \ldots, V_i, \ldots, V_n$ for the respective operation sections in accordance with an ideal speed reduction curve C, as shown in FIG. 2(a). In this case, a value set in advance by a target position setting device, namely, a keyboard (not shown) of the CPU 32, according to a positioning schedule and stored in the memory of the controller 19 is used as a target value corresponding to the target position. The CPU 32 has also intermittent operation means and continuous operation means which each are made of a program and function as follows: The intermittent operation means compares the target speed $V_i$ of the operation section $I_i$ with a measured piston speed V determined based on the signal $S_1$ received from the rotary encoder 8. If $V \geq V_i$, the CPU 32 intermittently outputs the primary braking signals $S_4$ or $S_4'$ to the second solenoid controlled valve 17 or 18, and the secondary braking signal $S_5$ to the magnetic brake 7. Accordingly, in FIG. 2(a), assuming that the ideal speed reduction curve C is identical with an actual piston speed V, there exists a region where $V \geq V_i$ in every operation section, as shown in FIG. 2(a). Therefore, intermittent brakes are applied to the piston rod 4 by the secondary solenoid controlled valve 17 or 18 and by the magnetic brake 7 in all the above operation sections. The level of the intermittent secondary braking force signal $S_5$ changes at such a high speed, that, in average, the braking enabled by the signal $S_5$ is considered to be continuously carried out.

Figure 2B:
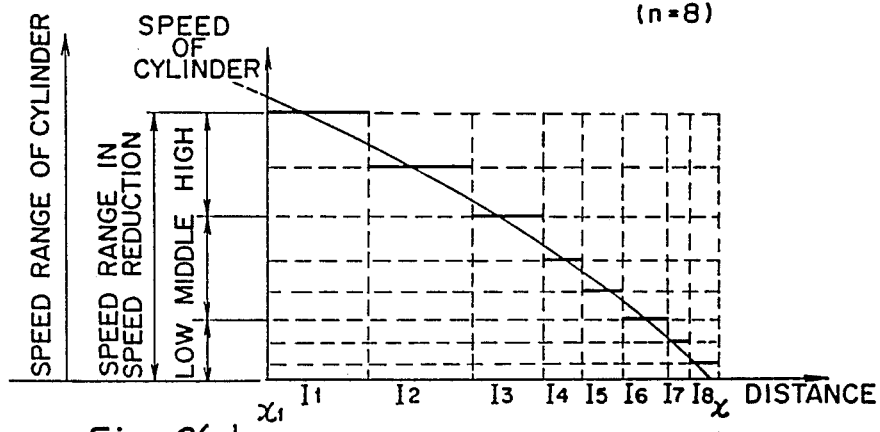
Figure 2C:
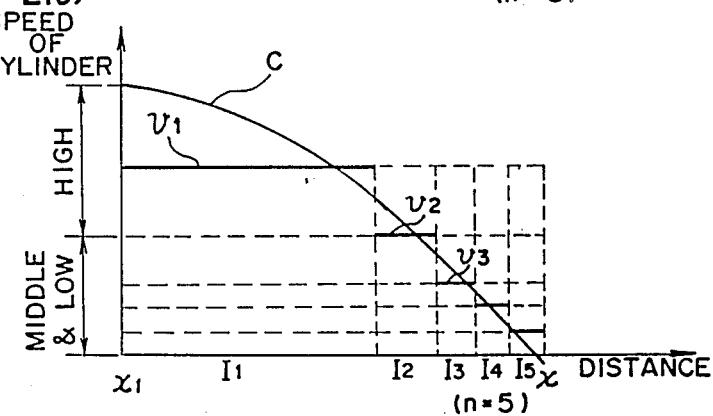

On the other hand, referring to the continuous operation means, as shown in FIG. 2(c), when a measured piston speed exceeds the target speed in at least an operation section including the speed reduction start position $X_1$ (in this case, only $I_1$) of the (n) pieces of operation sections, the continuous operation means continues outputting the primary braking signals $S_4$ or $S_4'$ to the second solenoid controlled valve 17 or 18. As a result, the piston rod 4 is kept braked in all the region of the $I_1$ irrespective of the measured piston speed V. Accordingly, if the measured piston speed V correspond to the ideal speed reduction curve C in FIG. 2 (c), it means that the braking force effected by the second solenoid controlled valves 17 or 18 was continuously applied to the piston rod 4 in all the region of $I_1$ of the first operation section. After that, the intermittent brakes were applied to the piston rod 4 only by the magnetic brake 7 in the following operation sections $I_2$ through $I_5$.

Either only the intermittent operation means or both the intermittent operation means and the continuous operation means can be operated when a braking mode signal for selecting one out of the intermittent and continuous operation means is outputted from a setting device such as a switch mounted on the controller 19 or the external device 20. When only the intermittent operation means is operated, any combinations of operation sections in which the primary braking signals $S_4$ or $S_4'$ are intermittently outputted and operation sections in which the secondary braking signals $S_5$ is intermittently outputted can be specified by a control mode signal for selecting the primary or secondary braking. When both the intermittent operation means and the continuous operation means are operated, any combinations of operation sections in which the primary braking signals $S_4$ or $S_4'$ are continuously outputted and operation sections in which the secondary braking signals $S_5$ are intermittently outputted can be specified by the control mode signal. That is, the primary or secondary braking can be specified by the control mode signal in the respective speed regions. For example, referring to FIG. 2(b), the primary braking can be selected for a high speed region and the secondary braking for middle and low speed regions and for the stop of the piston rod 4; or the primary braking for high and middle speed regions and the secondary braking for the middle and low speed regions and for the stop of the piston rod 4; or the primary braking in all the speed regions and the secondary braking only for the stop of the piston rod 4; and so on. Further, either the intermittent or continuous operation means can be selected for the primary and secondary braking forces according to a braking mode signal. For example, in one case, the continuous operation means may be selected for the primary braking force while the intermittent operation means may be selected for the secondary braking force. In another case, the intermittent operation means can be selected for both the primary and secondary braking forces.

The operation of the fluid apparatus is described with reference to flow charts shown in FIGS. 3 through 5.

Assume that a preset target position requires a forward stroke of the piston rod 4, that is, the piston rod 4 must travel toward the left in FIG. 1.

When a positioning start signal is inputted from a switch mounted on the external unit 20 or from the controller 19, the CPU 32 judges that the positioning control has started at step S1, and then, goes to step 2. When the drive signal $S_3$ is outputted to the primary solenoid controlled valve 13 through the exciting signal generation portion 34 and the driver 35 at step S2, the primary solenoid controlled valve 13 is switched to the right offset position. As a result, the primary air source 9 is connected to the first port $P_1$ of the pneumatic cylinder 1 through the first line 11 and the second port $P_2$ of the pneumatic cylinder 1 is opened to atmospheric air through the second line 12. Then, at step S3, the supply of the secondary braking signal $S_5$ to the magnetic brake 7 through the brake signal generation portion 33 and the driver 35 is stopped. As a result, the armature 7a attracted to the electromagnet 7b moves apart from it and the ball screw shaft 6 becomes rotatable. Accordingly, the piston 3 is moved toward the left in FIG. 1 by the air supplied from the first port $P_1$ and this forward stroke of the piston 3 is converted into the rotation of the ball screw shaft 6 through the ball nut 5 fixed to the piston 3. The rotary encoder 8 detects the number of revolutions of the ball screw shaft 6 and provides the CPU 32 of the controller 19 with the pulse signal $S_1$ corresponding to the position of the piston 3 determined based on the detected number of revolutions.

As a result, the CPU 32 determines the speed reduction start position $X_1$ in accordance with the ideal speed reduction curve C (See FIG. 2) and divides the curve C into (n) pieces of operation sections, and determines according to the braking mode signal and the control mode signal whether the brakings of the respective operation sections are of the intermittent or continuous mode and whether the brakings of the respective operation sections are of a first braking mode where the secondary solenoid controlled valve 17 or 18 operates or of a second braking mode where the magnetic brake 7 operates or of a combined braking mode where the secondary valve 17 or 18 and the magnetic brake operate in combination. Assuming that the control and braking modes are set as shown in FIG. 2(c), the description of the flow charts is made hereinafter. At step S4, the CPU 32 discriminates whether or not the piston position indicated by the pulse signal $S_1$ from the rotary encoder 8 has reached the speed reduction start position $X_1$. If the result of the discrimination indicates YES, the program goes to step S5 at which "first braking subroutine" is carried out for the brakes at the first operational section.

Figure 4:
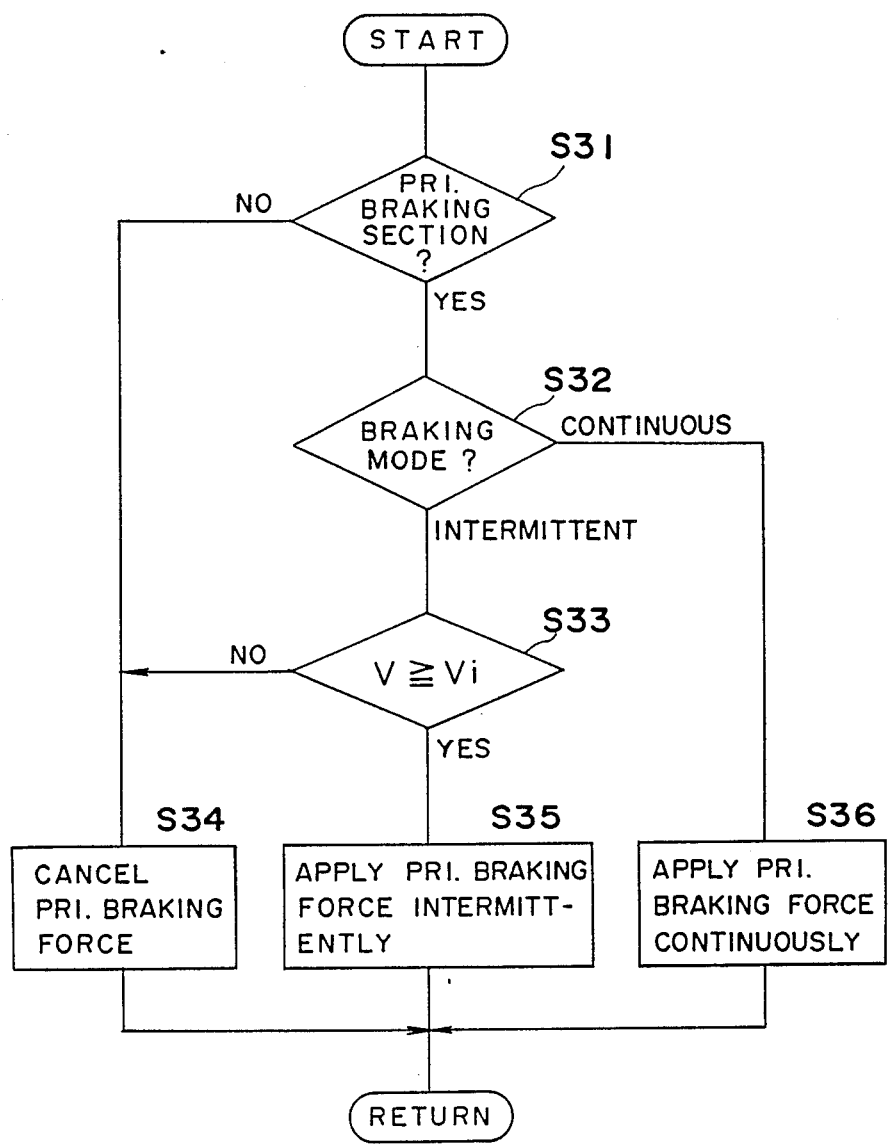
Figure 5:
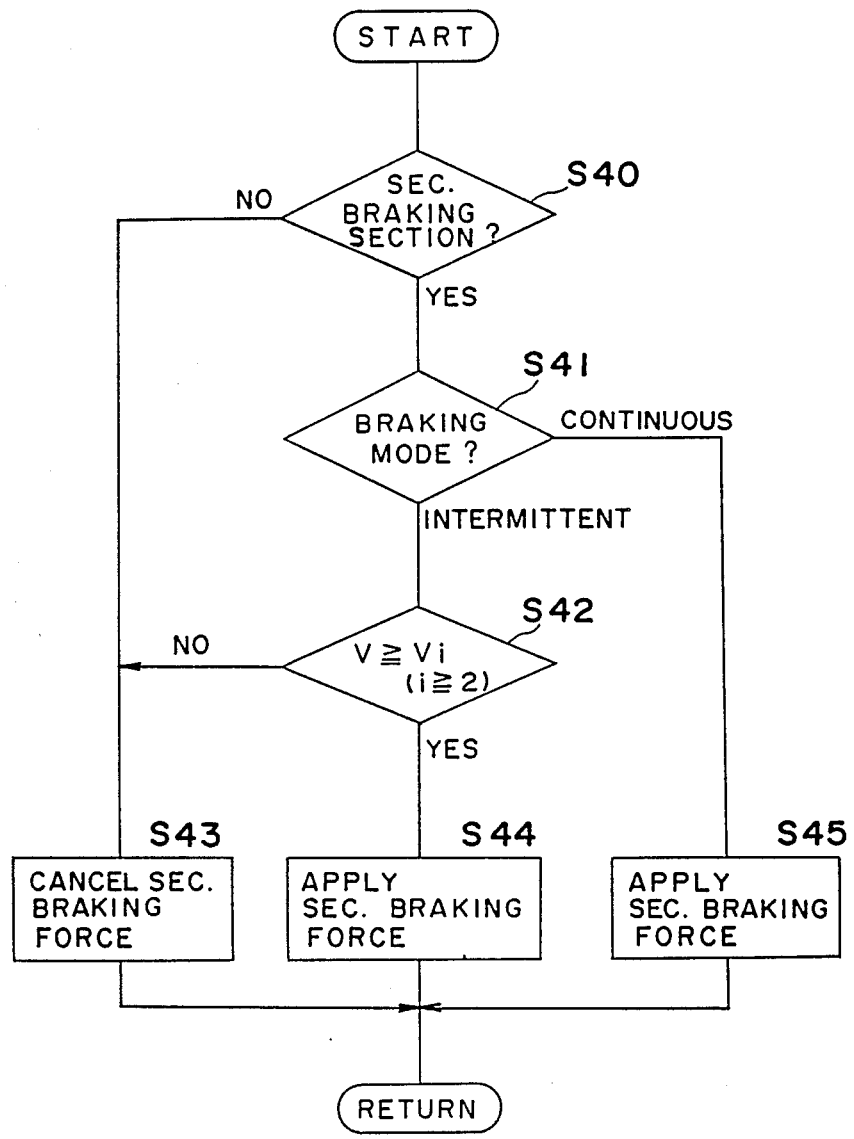

The first braking subroutine is carried out as shown in FIG. 4. That is, at step S31, the CPU 32 discriminates whether or not the piston position indicated by the pulse signal $S_1$ is in a primary braking mode section. If the result of the discrimination indicates NO, the primary braking force is cancelled at step S34, and then, the program returns. If the result of the discrimination at step S31 indicates YES, it is discriminated at step S32 whether the continuous operation means or the intermittent operation means is selected under the braking mode. If the continuous operation means is selected, the primary braking force is applied continuously at step S36. Thereafter, the program returns. If the intermittent operation means is selected under the braking mode, it is decided at step S33 whether or not the measured piston speed V indicated by the pulse signal $S_1$ is equal to or higher than the speed $V_i$ of the operation section Ii. If the result of the decision indicates YES, that is, $V \geq Vi$, the program goes to step S35, at which the controller 19 intermittently outputs the primary braking signal $S_4$ to the secondary solenoid controlled valve 18, whereby the secondary solenoid controlled valve 18 is switched to the right offset position so as to connect the second air source 14 to the second braking pressure port $P_2'$ of the pneumatic cylinder 1 through the second braking line 16. As a result, back pressure is applied from the second braking pressure port $P_2'$ to the piston 3 which is moving toward the left in FIG. 1, namely, toward the target position X, so that the speed of the piston 3 is reduced, and the program returns to the main routine. If the measured piston speed V is lower than $V_1$, the controller 19 stops outputting the primary braking signal $S_4$ and the braking operation which has been effected by the second solenoid controlled valve 18 is cancelled. Thereafter, the program returns to the main routine. Since the primary braking subroutine shown in FIG. 4 is repeated during the stroke of the piston rod 4, the piston 3 is intermittently braked to be correspondent to the ideal speed reduction curve C owing to the discrimination performed at step S33.

Figure 3:
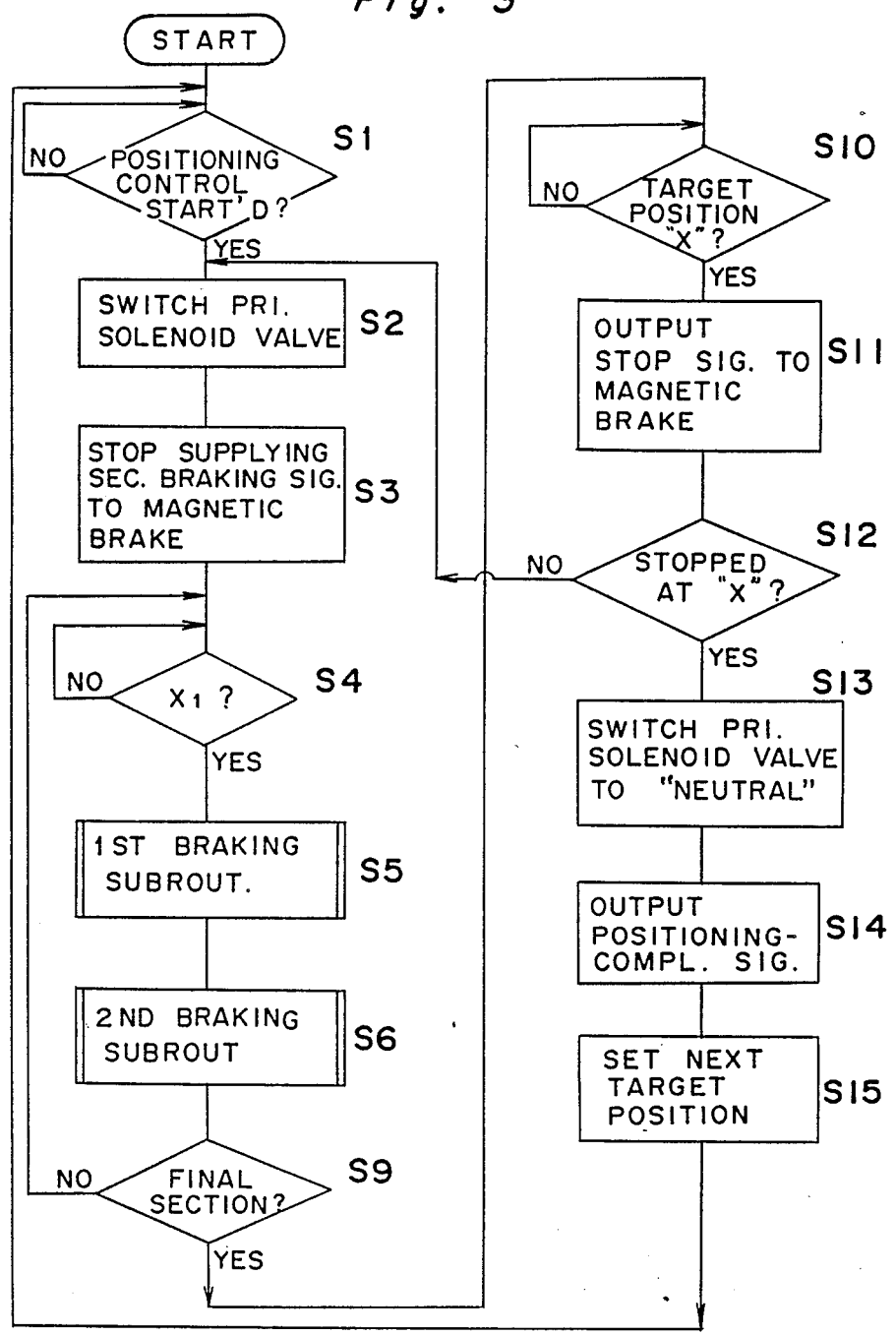
FIGS. 3 through 5 show a flow of the processing effected by the controller.

Thus, the processing returns to the main routine shown in FIG. 3. Now referring to FIG. 5, at step S6, "secondary braking subroutine" is carried out for the second operation section $I_2$ and the following operation sections shown in FIG. 2(c). It is judged at step S40 whether or not the piston position indicated by the pulse signals $S_1$ is in the secondary braking section where the secondary braking force is applied by the magnetic brake 7. If the result of the judgement indicates NO, the secondary braking force is cancelled at step S43, and the program returns. If the piston position is in the secondary braking section, it is discriminated at step S41 whether the continuous operation means or the intermittent operation means is selected under the braking mode. If the continuous operation means is selected, the secondary braking force is applied at step S45, and then, the program returns. If the intermittent operation means is selected, it is discriminated whether or not the measured piston speed V is equal to and higher than the target speed Vi ($i \geq 2$) of the respective sections Ii. If the result of the discrimination indicates YES, namely, $V \geq Vi$, the program goes to step S44 so that an intermittent braking is applied. If the discrimination result indicates $V < Vi$, the program goes to step S43 so as to cancel the intermittent braking, and then, returns.

At step S9, it is decided whether or not the piston position indicated by the pulse signals $S_1$ corresponds to a final operation section. If the piston position is not in the final operational section, the program returns to step S4, and repeats the braking loop consisting of steps S4, S5, S6 and S9. If the piston position is in the final section, the program goes to step S10 at which it is discriminated whether or not the piston rod 4 has reached the target position X. If the discrimination result indicates YES, the secondary braking signal $S_5$ is outputted from the controller 19 to the magnetic brake 7 and the magnetic brake 7 brakes the rotation of the ball screw shaft 6 so as to stop the piston rod 4. Next, it is decided whether or not the piston rod 4 has stopped at the target position X. If the result of the decision indicates NO, the program returns to step S2 at which a fine adjustment of the stop position is made. If the discrimination indicates that the piston rod 4 has stopped at the target position X, the program goes to step S13 at which the controller 19 stops outputting the drive signal $S_3$ to the primary solenoid controlled valve 13. As a result, the primary solenoid controlled valve 13 takes the neutral position. The positioning of the piston rod 4 is effected with air pressure applied from the first air source 9 to both sides of the piston 3. Finally, at step S14, a signal indicative of the positioning completion is outputted to the external unit 20. At step S15, the next target position is set by the CPU 32 in accordance with the positioning schedule, and then, the program returns to step S1. In addition, when the piston rod 4 is moved backward, that is, toward the right in FIG. 1, the positioning control of the piston rod 4 is effected in the same manner as described above.

In the above embodiment, air is introduced from the air source 14 into the first and secondary braking pressure ports $P_1'$ and $P_2'$ formed at both end portions of the tube $2a$ of the pneumatic cylinder 1 through the first and second braking lines 15 and 16 used only for braking. Therefore, back pressure is effectively applied to the piston 3 and the primary braking is effectively accomplished compared with the case in which air of the air source 9 would be introduced into the tube $2a$ through the lines 11 and 12 which have many elements, and the first and second ports $P_1$ and $P_2$ for braking the piston rod 4. The CPU 32 of the controller 19 sets the control modes of the respective operation sections Ii according to the ideal speed reduction curve C. Further, the second solenoid controlled valves 17 and 18 acting as the primary braking means and the magnetic brake 7 acting as the secondary braking means are operated in any desired combination by appropriately selecting the intermittent operation means and the continuous operation means so that they are operated independently or in combination. Therefore, the piston rod 4 is optimally braked depending on operation sections, so that vibration and shock generated in a braking operation is relieved to a great extent compared with the continuous braking effected by a conventional magnetic brake. Furthermore, the piston rod is stopped at a predetermined position and the positioning of the piston rod is accurately carried out. In addition, the magnetic brake is much more durable than the conventional one, because the magnetic brake is used with the back pressure brake. The controller 19 is provided with means for detecting the following errors; errors in controlling the piston such as, for example, non-operation of the piston 3, non-stop of the piston 3 at a target position and an excess over the allowable speed of the piston; errors in the system such as an unexpected instruction to start speed reduction, made without data input of a target position, abnormality in the memory data on a target position due to noise or the like, and non-preferable back-up of the memory.

Figure 6:
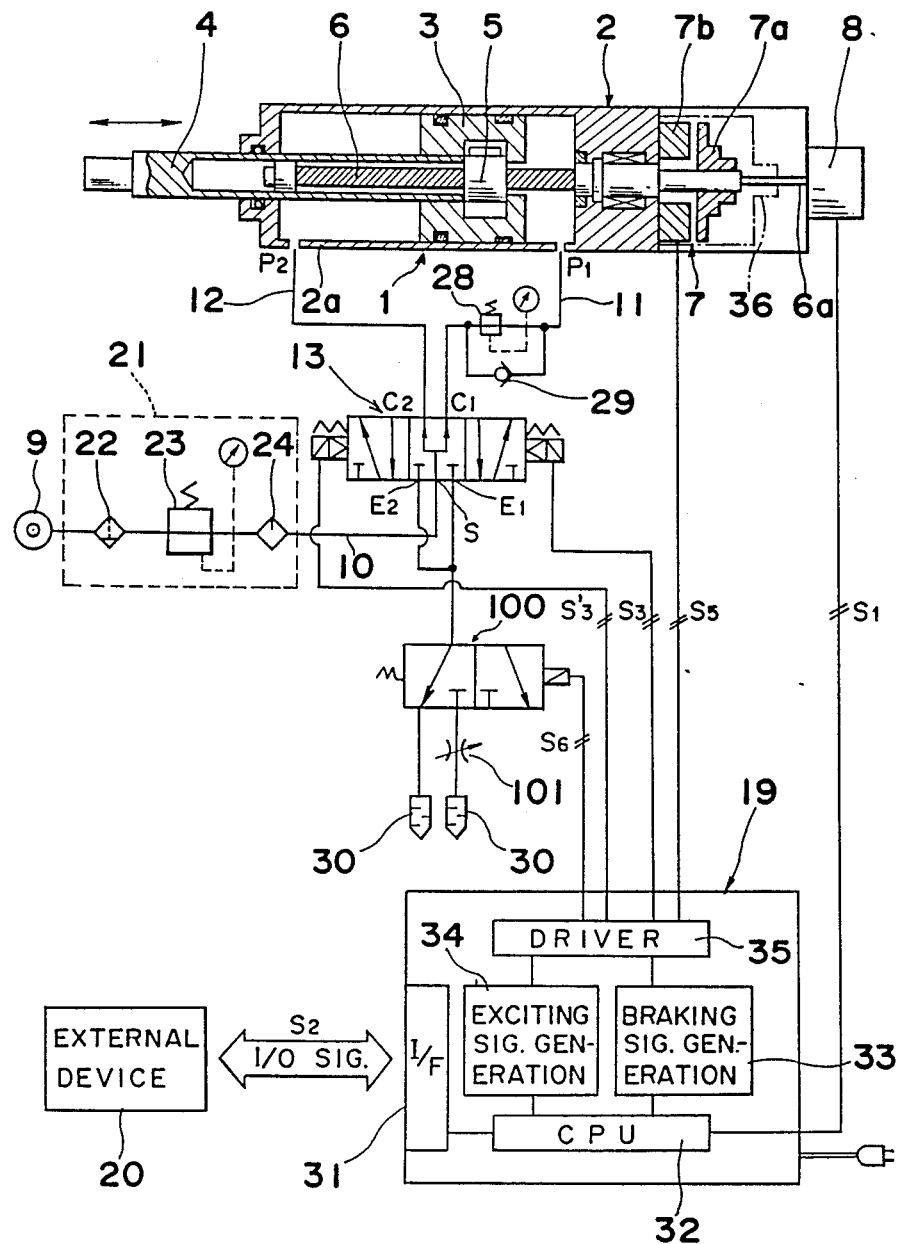
FIG. 6 schematically shows a modification wherein a primary braking is carried out by a throttle valve.

The fluid apparatus shown in FIG. 6 is a modification of the one described above in which the second air source 14, the first and second braking lines 15 and 16, and the second solenoid controlled valves 17 and 18, which form the primary braking means, are omitted from the one shown in FIG. 1 and an exhaust throttle valve 101 is mounted on the exhaust side of the pneumatic cylinder 1 so that it acts as the primary braking means. That is, the speed control valves 25 provided o the first line 11 and the second line 12, respectively, as shwon in FIG. 1, are not provided and the exhaust ports $E_1$ and $E_2$ of the primary solenoid controlled valve 13 are connected to a 2-position and 3-port connection solenoid controlled valve 100 which is switched by a primary braking signal $S_6$ outputted from the controller 19. The throttle valve 101 is provided on one of the exhaust lines of the valve 100 so that exhaust gas from the pneumatic cylinder 1 is discharged through the throttle valve 101. Thus, back pressure is applied to the piston 3 to brake the piston 3. Almost the same advantage of the primary braking as that to be obtained by the fluid apparatus shown in FIG. 1 is obtained. Instead of the primary braking means of the embodiment shown in FIG. 1, an electro-dynamic brake 36 (See FIG. 1) whose braking force is adjusted by the primary braking signal transmitted from the controller 19 is mounted on the end $6a$ of the ball screw shaft 6 of the pneumatic cylinder 1 so as to apply the primary braking force to the piston rod 4.

In addition to the above examples, first and second braking lines may be connected to the first and second ports $P_1$ and $P_2$, respectively. FIG. 7 shows an example of such a case. The construction of this example is the same as that shown in FIG. 1. In FIG. 7, a first braking line 15' is connected to the first line 11 communicated to the first port $P_1$ and a second braking line 16' is connected to the second line 12 communicated to the second port $P_2$.

Furthermore, a single 2-position and 3-port connection directional control valve may be provided at the position at which the first and second braking lines are confluent, instead of the secondary solenoid controlled valve. The braking mode in accordance with the present invention is not limited to the one in the embodiments.

As apparent from the foregoing description, according to the present invention, an optimum control for the braking of the piston rod is accomplished for every operation section by the continuous or intermittent application of the primary braking effected by the second solenoid controlled valve in appropriate combination with the secondary braking effected by the magnetic brake. Therefore, vibration and shock which will occur during a braking operation is relieved to a great extent compared with the conventional continuous braking effected by a magnetic brake only. In this way, the piston can be stopped and positioned at a desired position very accurately. In addition, the magnetic brake can be very durable.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fluid apparatus comprising:
   a hydraulic cylinder which includes a main body having a tube, a piston slidably mounted in the tube, and a hollow rod fixed to the piston, wherein the hollow rod accommodates therein a ball screw shaft which is rotatably and axially unmovably mounted in the main body and is engaged with a ball nut fixed to the piston coaxially therewith, and an end portion of the ball screw shaft projects from the main body;
   a magnetic brake which is fixed to an end portion of the main body of the hydraulic cylinder, and brakes the rotation of the ball screw shaft;
   a rotary encoder for detecting the number of revolutions of the ball screw shaft of the hydraulic cylinder and outputting electric signals indicative of the detected number of revolutions;
   a primary solenoid controlled valve for reciprocating the piston by connecting a pressure source either to a first port or to a second port of the hydraulic cylinder;
   a first braking line connected to a first braking pressure port of the hydraulic cylinder;
   a second braking line connected to a second braking pressure port of the hydraulic cylinder;

secondary solenoid controlled valves connected to the first and second braking lines for connecting a pressure source either to the first braking pressure port or to the second braking pressure port; and a controller which outputs a drive signal for controlling the primary solenoid controlled valve on one hand, and on the other hand, smoothly stops the piston at a target position by outputting a primary braking signal and a secondary braking signal in accordance with a corresponding operational section as well as deviation of the signal received from the rotary encoder from a signal indicating a predetermined target value, the primary braking signal being for switching on or off the secondary solenoid controlled valves so that back pressure is applied to the piston driven by pressure of a fluid which flows from the pressure source through the primary solenoid controlled valve, and the secondary braking signal being for operating the magnetic brake.

2. A fluid apparatus comprising:

a hydraulic cylinder which includes a main body having a tube, a piston slidably mounted in the tube, and a hollow rod fixed to the piston, wherein the hollow rod accommodates therein a ball screw shaft which is rotatably and axially unmovably mounted in the main body and is engaged with a ball nut fixed to the piston coaxially therewith, and an end portion of the ball screw shaft projects from the main body;

a magnetic brake which is fixed to an end portion of the main body of the hydraulic cylinder, and brakes the rotation of the ball screw shaft;

a rotary encoder for detecting the number of revolutions of the ball screw shaft of the hydraulic cylinder and outputting electric signals indicative of the detected number of revolutions;

a primary solenoid controlled valve for reciprocating the piston by connecting a pressure source either to a first port or to a second port of the hydraulic cylinder;

a first braking line connected to a line between the primary solenoid controlled valve and the first port of the hydraulic cylinder;

a second braking line connected to a line between the primary solenoid controlled valve and the second port of the hydraulic cylinder;

secondary solenoid controlled valves connected to the first and second braking lines for connecting a pressure source either to the first port or to the second port; and a controller which outputs a drive signal for controlling the primary solenoid controlled valve on one hand, and on the other hand, smoothly stops the piston at a target position by outputting a primary braking signal and a secondary braking signal in accordance with a corresponding operational section as well as deviation of the signal received from the rotary encoder from a signal indicating a predetermined target value, the primary braking signal being for switching on or off the secondary solenoid controlled valves so that back pressure is applied to the piston driven by pressure of a fluid which flows from the pressure source through the primary solenoid controlled valve, and the secondary braking signal being for operating the magnetic brake.

3. A fluid apparatus as claimed in claim 1, wherein the first braking pressure port is provided on the tube of the hydraulic cylinder on the side opposite to the first port and the second braking pressure port is provided on the tube of the hydraulic cylinder on the side opposite to the second port.

4. A fluid apparatus as claimed in claim 1, wherein the controller includes an intermittent operation means for intermittently outputting the primary braking signal to the secondary solenoid controlled valves and the secondary braking signal to the magnetic brake when an actual speed of the piston determined based on the signal from the rotary encoder is compared with a target speed determined in advance based on an ideal speed reduction curve and the actual speed of the piston is decided to be equal to and higher than the target speed.

5. A fluid apparatus as claimed in claim 1, wherein the controller includes a continuous operation means for continuously outputting the primary braking signal to the secondary solenoid controlled valves at least at an early period of the speed reduction and an intermittent operation means for intermittently outputting the secondary braking signal to the magnetic brake when an actual speed of the piston determined based on the signal from the rotary encoder is compared with a target speed determined in advance based on an ideal speed reduction curve and the actual speed of the piston is decided to be equal to and higher than the target speed.

6. A fluid apparatus as claimed in claim 3, wherein the controller includes an intermittent operation means for intermittently outputting the primary braking signal to the secondary solenoid controlled valves and the secondary braking signal to the magnetic brake when an actual speed of the piston determined based on the signal from the rotary encoder is compared with a target speed determined in advance based on an ideal speed reduction curve and the actual speed of the piston is decided to be equal to and higher than the target speed.

7. A fluid apparatus as claimed in claim 3, wherein the controller includes a continuous operation means for continuously outputting the primary braking signal to the secondary solenoid controlled valves at least at an early period of the speed reduction and an intermittent operation means for intermittently outputting the secondary braking signal to the magnetic brake when an actual speed of the piston determined based on the signal from the rotary encoder is compared with a target speed determined in advance based on an ideal speed reduction curve and the actual speed of the piston is decided to be equal to and higher than the target speed.

8. A fluid apparatus as claimed in claim 5, wherein an electro-dynamic brake applying a braking force to the ball screw shaft is fixed to an end portion of the main body of the hydraulic cylinder.

9. A fluid apparatus as claimed in claim 7, wherein an electro-dynamic brake applying a braking force to the ball screw shaft is fixed to an end portion of the main body of the hydraulic cylinder.

* * * * *